No. 664,664. Patented Dec. 25, 1900.
B. T. MONTGOMERY.
BOOK OR COPY HOLDER.
(Application filed Apr. 10, 1900.)

(No Model.) 6 Sheets—Sheet 1.

WITNESSES:
M. Bloudel
F. S. Stitt

INVENTOR
B. T. Montgomery.
BY Munn & Co.
ATTORNEYS

THE NORRIS PETERS CO., PHOTO-LITHO., WASHINGTON, D. C.

No. 664,664. Patented Dec. 25, 1900.
B. T. MONTGOMERY.
BOOK OR COPY HOLDER.
(Application filed Apr. 10, 1900.)

(No Model.) 6 Sheets—Sheet 2.

WITNESSES:
M. Blondell
F. S. Stitt.

INVENTOR
B. T. Montgomery.
BY Munn & Co.
ATTORNEYS

No. 664,664. Patented Dec. 25, 1900.
B. T. MONTGOMERY.
BOOK OR COPY HOLDER.
(Application filed Apr. 10, 1900.)

(No Model.) 6 Sheets—Sheet 3.

WITNESSES:
M. S. Bloudel.
F. S. Stitt.

INVENTOR
B. T. Montgomery.
BY Munn & Co.
ATTORNEYS

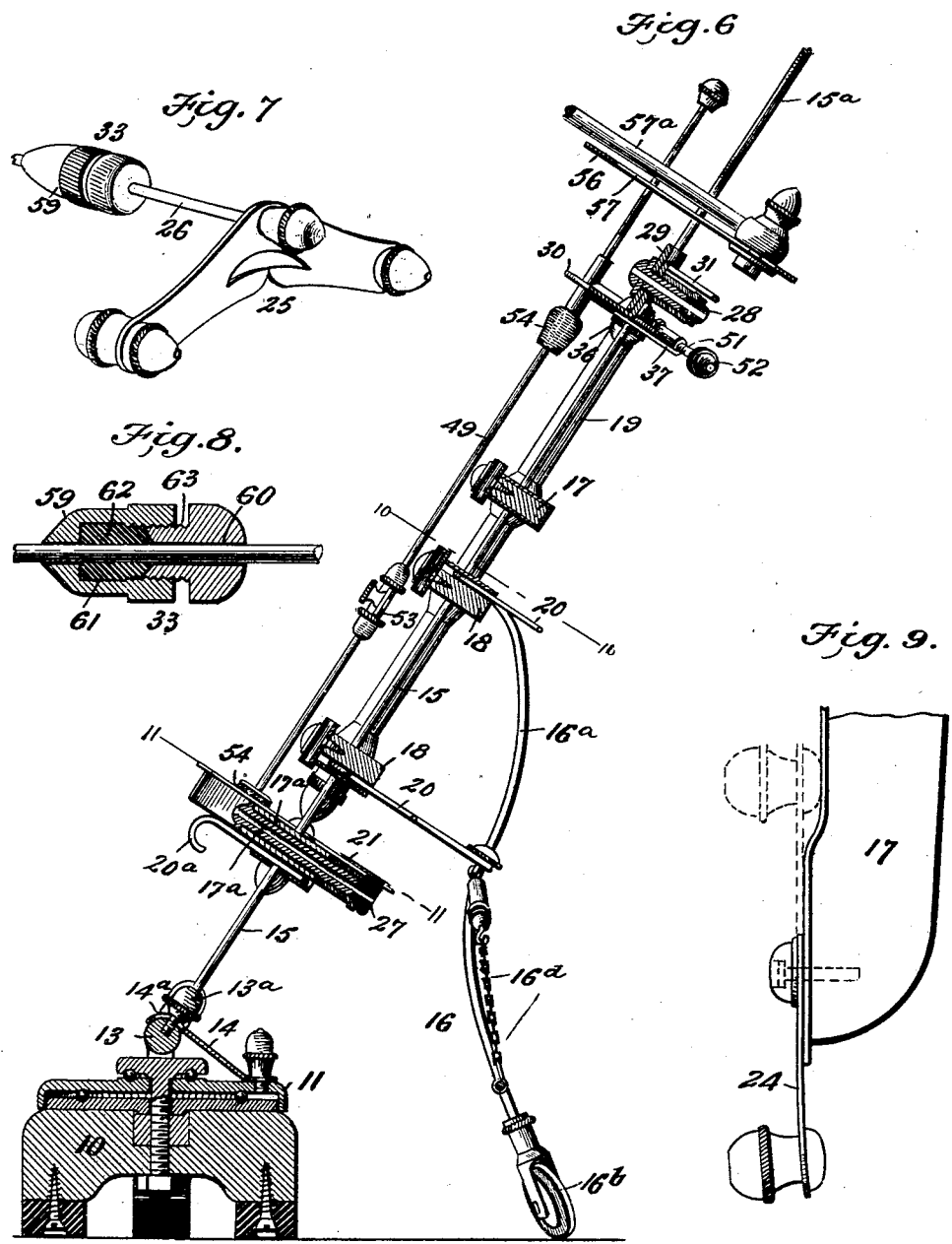

No. 664,664. Patented Dec. 25, 1900.
B. T. MONTGOMERY.
BOOK OR COPY HOLDER.
(Application filed Apr. 10, 1900.)
(No Model.) 6 Sheets—Sheet 5.
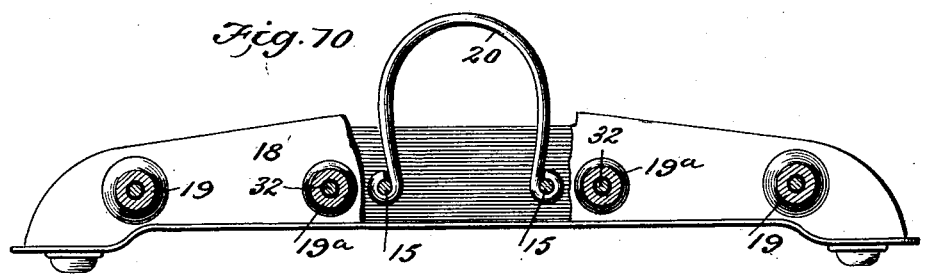
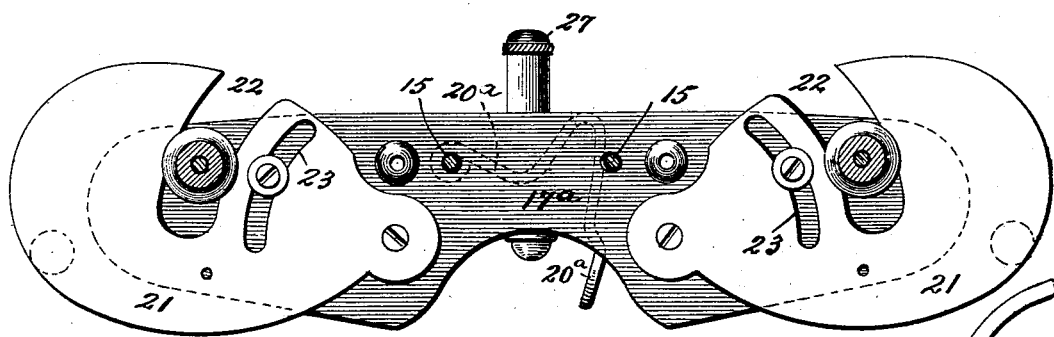
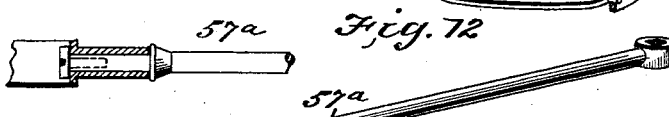
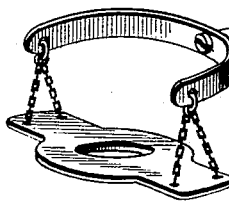
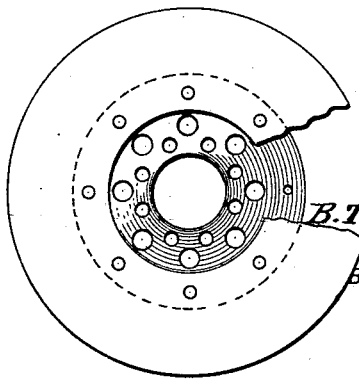
WITNESSES:
INVENTOR
B. T. Montgomery
BY
ATTORNEYS No. 664,664. Patented Dec. 25, 1900.
B. T. MONTGOMERY.
BOOK OR COPY HOLDER.
(Application filed Apr. 10, 1900.)

(No Model.) 6 Sheets—Sheet 6.

WITNESSES:
M. S. Blondel
F. S. Stitt

INVENTOR
B. T. Montgomery.
BY Munn & Co.
ATTORNEYS

UNITED STATES PATENT OFFICE.

BURGESS T. MONTGOMERY, OF WASHINGTON, DISTRICT OF COLUMBIA.

BOOK OR COPY HOLDER.

SPECIFICATION forming part of Letters Patent No. 664,664, dated December 25, 1900.

Application filed April 10, 1900. Serial No. 12,338. (No model.)

*To all whom it may concern:*

Be it known that I, BURGESS T. MONTGOMERY, of Washington city, in the District of Columbia, have invented a new and useful Improvement in Book or Copy Holders, of which the following is a specification.

My invention is an improvement in holders or stands for books, loose sheets, documents, or the like to be used by public speakers, copyists, and others; and it has for its object a holder of this character which can be conveniently arranged to hold any of the articles above mentioned of any reasonable thickness and which can be adjusted to different elevations and inclinations and arranged for different articles as desired.

The invention consists in certain details of construction and arrangements and combinations of the parts, which I shall hereinafter fully describe and claim.

Reference is to be had to the accompanying drawings, forming part of this specification, in which like characters of reference indicate corresponding parts in all the views in which they occur.

Figure 1:
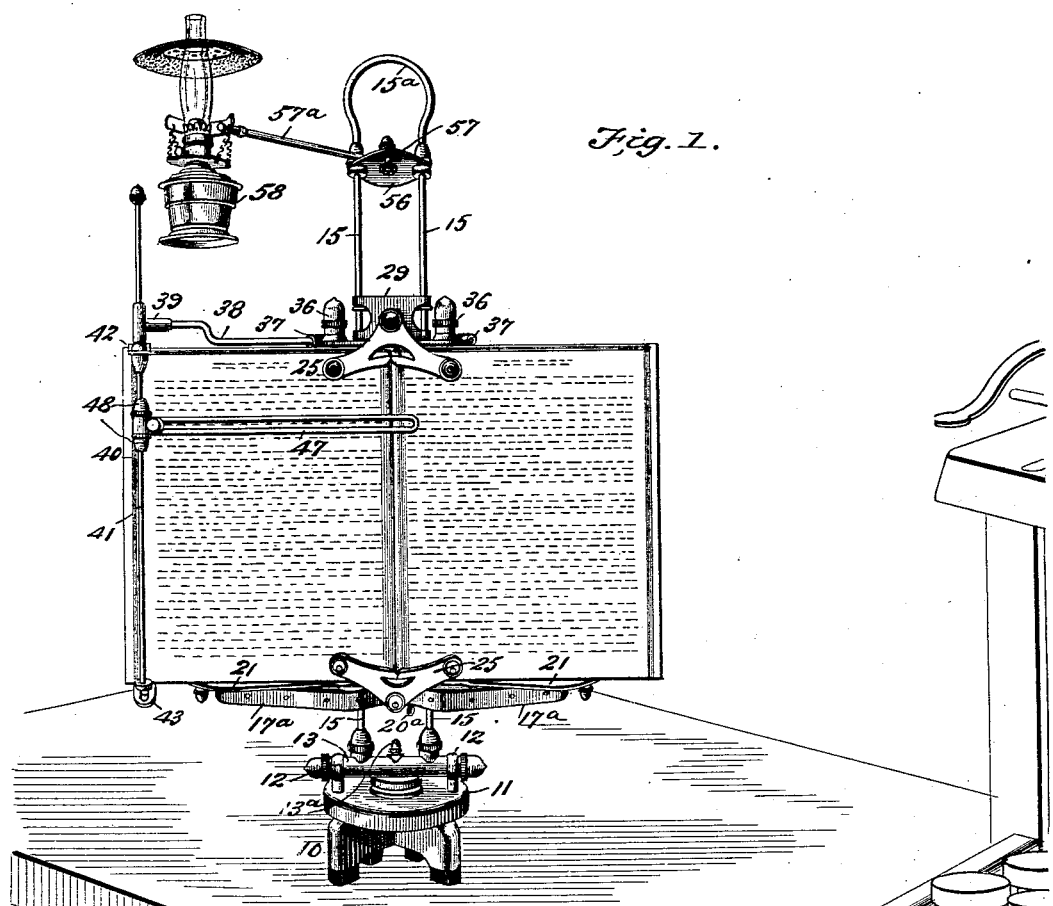
Figure 3:
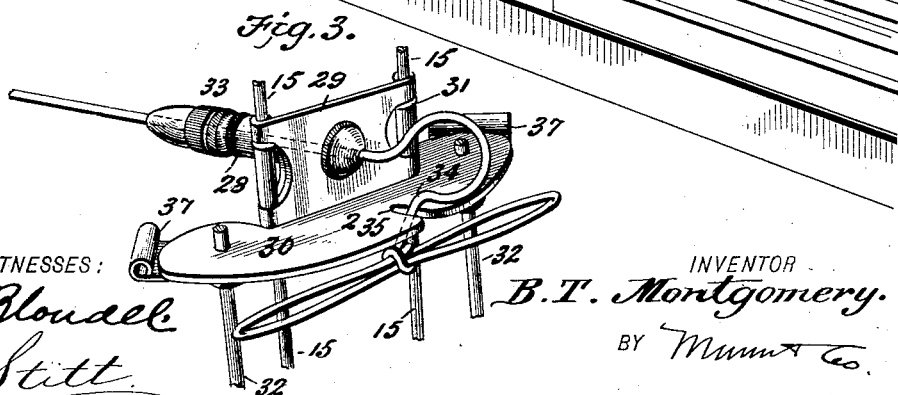
Figure 2:
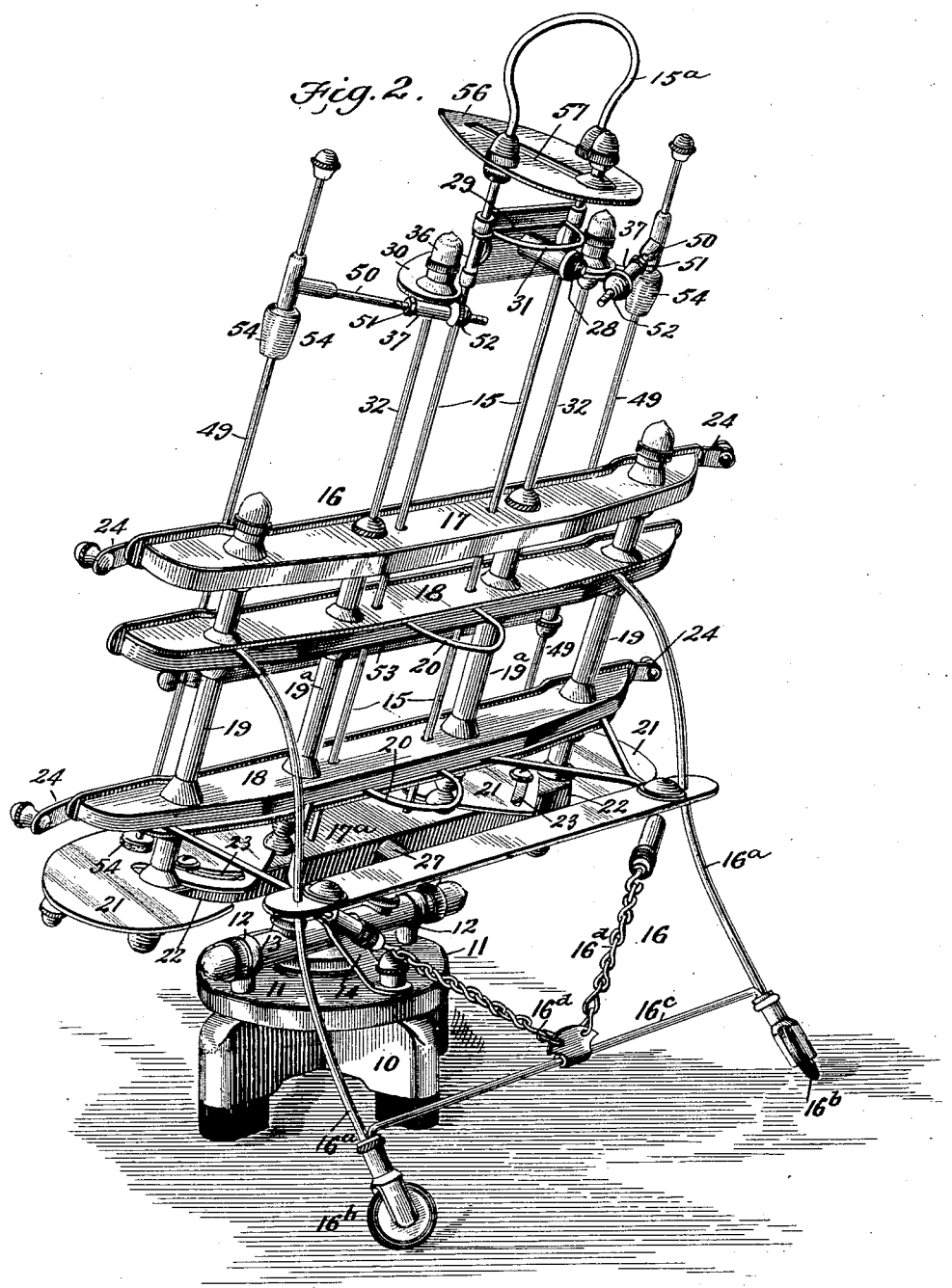
Figure 4:
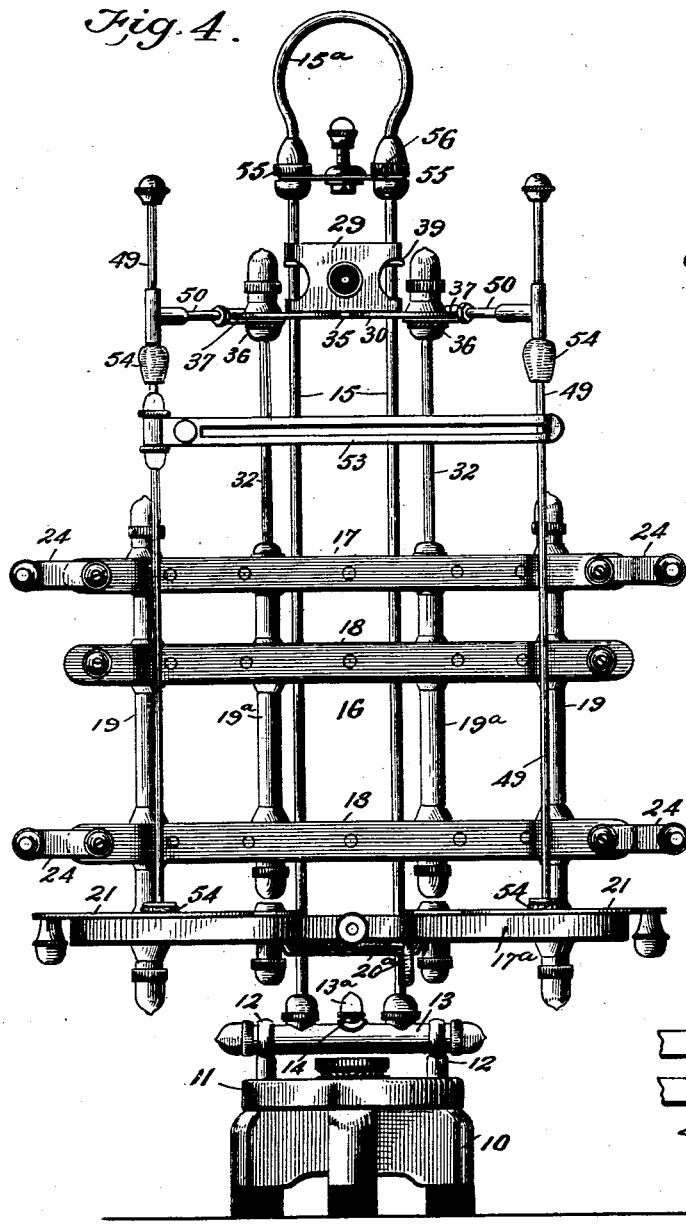
Figure 5:
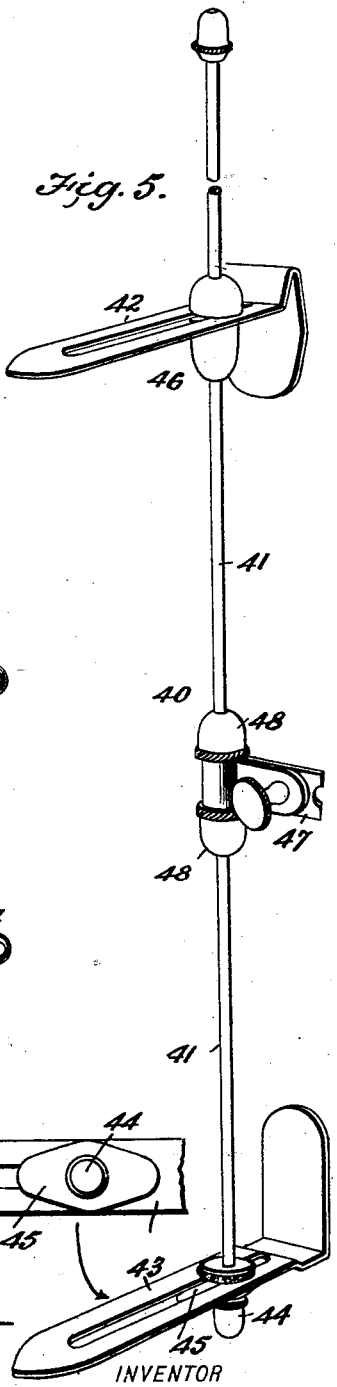
Figure 16:
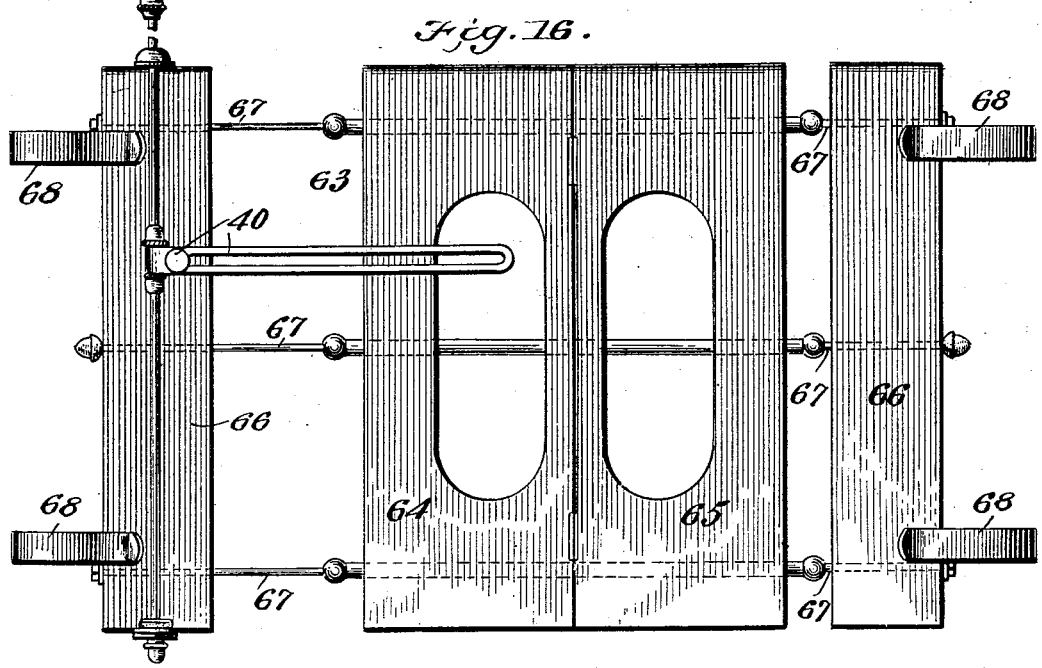
Figure 17:
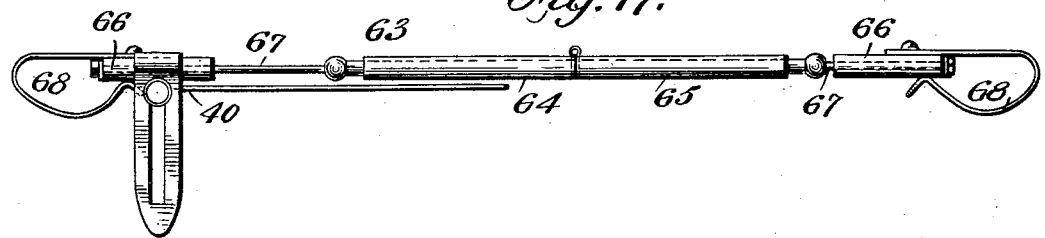
Figure 18:
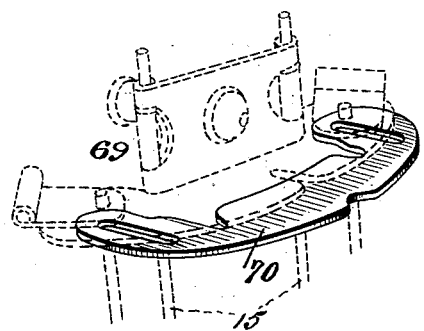

Figure 1 is a perspective view of my improved book and copy holder arranged on a stand and holding an open book for copy. Fig. 2 is a rear perspective of the same arranged for holding loose sheets. Fig. 3 is a detail perspective view of a modified form of a spreader for an open book. Fig. 4 is a front view of the device as arranged in Fig. 2. Fig. 5 is an enlarged perspective view of a leaf-retaining device shown detached and with its line-indicator partly broken away. Fig. 6 is a vertical section of the device arranged as in Figs. 2 and 4. Fig. 7 is a detail perspective view of the preferred form of spreader. Fig. 8 is a longitudinal section of a friction clamp or keeper on a rod. Fig. 9 is a detail plan view of a portion of a cross-bar of the rest or holder with its extension-clip. Fig. 10 is a detail horizontal section on the line 10 10 of Fig. 6. Fig. 11 is a similar view on the line 11 of Fig. 6. Fig. 12 is a detail perspective view of the lamp-holder. Fig. 13 is a fragmentary view of the rod of the same, and Fig. 14 is a top view of a lamp-shade employed. Fig. 15 is a perspective view of a holder especially designed for incandescent and other lamps. Fig. 16 is a face view of an auxiliary support for unusually long sheets. Fig. 17 is a top edge view thereof, and Fig. 18 is a detail perspective view of a modification.

Referring to the drawings, 10 designates the pedestal of my improved book and copy holder, having rubber-padded feet and provided with a ball-bearing rotatable top plate 11, from whose upper face rise sockets 12, in which a horizontal spindle 13 is journaled. The movement of such spindle with respect to the plate 11 is limited by means of a metal strap 14, secured to the plate and having an elongated slot $14^a$, in which a lug $13^a$ on the spindle is fitted. The spindle 13 has secured thereto the main supporting-rods 15, preferably integrally connected at their upper ends by a bow $15^a$, whereby is formed a handle by which the device may be lifted or carried from place to place, and the holder or support 16 is mounted on said rods and is free to move up and down thereon.

The holder or support 16, as shown particularly in Fig. 2, comprises top and bottom cross-bars 17 $17^a$ and intermediate cross-bars 18, connected rigidly together by vertical side posts 19 and intermediate posts $19^a$. All the cross-bars, as shown, are apertured to receive the rods 15, whereby the support 16 may be slid along the rods, and tension is exerted outwardly between the rods 15 by bow-springs 20, as shown in Figs. 2 and 10, so as to effect a sufficient amount of friction to hold the support 16 at any elevation. A spring locking-brake $20^a$ is also provided, being secured to one rod and acting as a cam against the other rod underneath the lowermost cross-bar $17^a$ to lock the support at various elevations, as best seen in Fig. 11. The lower cross-bar $17^a$ forms a bottom rest for the book or copy and is made extensible in width to accommodate varying thicknesses by means of leaves or wings 21, pivoted on the upper face of the bottom rest to swing in a plane parallel with such face, and provided with segmental slots 22 and 23, limiting their movement. It is evident that the slots 23 may be dispensed with, if desired, and the slots 22 closed around the side posts 19 to limit the movement of the leaves 21.

The cross-bars 17 and 18, which form the back-rest for the book or other article, are curved or offset forwardly at their ends and are there provided with pivoted fingers 24, which may be turned outwardly to form lateral extensions of the support or be turned inwardly over the edges of manuscript held on the support, thus acting in the capacity of clips, as shown in Fig. 9. These fingers may be fitted on one or both of the intermediate cross-bars 18, as desired.

Legs 16$^a$ are secured rigidly to the holder 16 and extend rearwardly and downwardly therefrom, being fitted at their lower ends with rollers 16$^b$, which are so arranged that they will travel in the circumference of a circle of which the pedestal 10 is the center, and said legs are braced horizontally and angularly by braces 16$^c$ and 16$^d$, as shown. Now it will be observed that the holder or support 16 is free to move about the pedestal 10 as an axis, and as the main supporting-rods 15 are free to swing in a vertical plane any elevation or lowering of the support 16 on the rods will cause a corresponding increase or decrease in the inclination of the said support 16, as the supporting-legs 16$^a$ always maintain the same angle with respect to the holder 16.

It is especially important when the holder is used for a book to provide simple means for maintaining the book in open position, and for this purpose I provide spreaders 25, secured to the ends of rods 26, there being preferably two used, and one being inserted through a transversely-extending rubber-tipped bearing 27 in the lower cross-bar 17$^a$, while the other is inserted in a rubber-tipped bearing 28, secured to a leaf-bracket 29, said bracket being carried by a plate 30, whose ends are slidably fitted on the rods 15 and which is frictionally held on said rods by a bow-spring 31. Guide-rods 32 depend from the outer ends of the bracket 29 and move in the posts 19$^a$ as the bracket is raised and lowered. Each rod 26 of the spreaders is provided with a keeper 33, inserted thereon and frictionally engaging the rods, said keepers being adapted to be moved up against the rubber-tipped ends of the bearings 27 and 28 to keep the spreaders firmly against the open book no matter how thick the same may be, and the upper spreader, as is evident, may be carried by the bracket 29 toward and from the lower to accommodate books of different heights. When an unusually thin book is to be held open, I preferably use a spreader of the form shown in Fig. 3, which is made out of a single piece of wire in bow-knot form and has a portion 34 adapted to fit in a recess 35 in the plate 30. With regard to these spreaders it will be seen that the essential and distinctive features of the same are an axial rod passing through a bearing in a line substantially at right angles to the plane of the book-holder, said rod having two bearing-arms offset to the same side of the axial center, so that when rotated about said center the arms will both pass off the book to allow the turning of a page, the axial rod being also longitudinally adjustable to accommodate books of different thickness and having locking devices for holding it to its adjusted position. These spreaders are a necessary part of the book-holder and have an intimate relation and coöperation with said holder and the parallel supporting-rods for the holder in accomplishing the objects of my invention.

Pivoted on the guide-rods 32 and held between the lower side of the bracket 29 and lock-nuts 36 are bearing-plates 37, either of which is adapted to have inserted therethrough an arm 38, having a T-head 39, adapted to receive and hold the upper end of a book-leaf retainer 40, as shown in Figs. 1 and 5. This latter consists of a rod 41, inserted through and depending from the T-head 39 of the arm 38, and angular slotted edge-retaining plates 42 and 43, of which the lower plate is held in adjusted position around the lower edge of the book by means of a binding-nut 44 and strengthening-washer 45, while the upper plate 42 is held in adjusted position around the upper edge of the book between the interlocking sections of a clamp 46, frictionally fitted on the rod 41. A line spacer or indicator 47 is pivotally mounted on the rod 41 between two friction-clamps 48, as shown.

When it is desired to support loose sheets, documents, or the like upon the holder 16, I preferably employ sheet-retaining rods 49, (shown in Fig. 4,) which have their lower ends detachably fitted by screw-thread engagement in the extension-leaves 21, while their upper ends are inserted through the T-heads of supporting-arms 50, whose shanks are adapted to extend through the pivoted bearing-plates 37 and are screw-threaded to receive the lock-nuts 51 and 52, whereby to hold the upper ends of the rods 49 in suitable contact with the sheets, while the lower portions of the rods are brought into proper position by moving the extension-leaves 21. A line spacer or indicator 53 is frictionally mounted on one of the rods 49, and upper and lower knobs 54, of cork or other suitable material, are fitted on the rods 49 to bear against the paper.

At the upper ends of the supporting-rods 15, between the interlocking sections of friction-clamps 55, is detachably held a lamp-supporting plate 56, having an elongated slot 57, in which is adjustably held the rear end of a forked arm 57$^a$, adapted to receive a lamp 58, freely swinging in the forked end of said arm 57$^a$, whereby light may be conveniently thrown upon the face of the paper on the holder. Said lamp adjustment is convenient also for connecting and holding incandescent, gas, and other lighting appliances.

All of the frictional keepers or clamps employed in my device are of the construction shown in Fig. 8 and are composed of longitudinally-smooth-bored sections 59 and 60, of which the section 59 is formed with a threaded socket 61, in which is fitted a rubber or other compressible washer 62, and the section 60 has a threaded countersunk boss or extension 63, which as it screws in the section 59 compresses the washer 62, so that when the connected sections are inserted on a rod the keeper may be tightened or loosened on the rod by screwing the sections more or less tightly together.

As shown in Figs. 16 and 17, I employ an auxiliary support or back 63, adapted to rest upon the extension leaves or wings 21 and constructed in hinged sections 64 and 65, each of which is provided with an extensible board 66, guided by rods 67, as shown, and formed at their ends with spring-clips 68, adapted to engage the edges of the sheets or manuscript. I may also attach the retainer 40 to this auxiliary back or support, as shown. I usually reverse this back if it is used for a book.

Fig. 18 illustrates a modification of the bracket which is adapted to hold the upper book-spreader 25, and consists in making the bracket 69 extensible by means of a slotted plate 70, fitted on the rods 15 and slidable in and out, as indicated, in order to adapt the upper spreader to books of different thicknesses.

Having thus described my invention, what I claim as new, and desire to secure by Letters Patent, is—

1. In a device of the character described, the combination with a pedestal; of a top plate pivoted about a vertical axis and bearing a horizontal spindle, main supporting-rods mounted to freely swing in a vertical plane on said top plate about this horizontal spindle, and a holder or rest slidably fitted on said rods and provided with legs substantially as shown and described.

2. In a device of the character described, a pedestal, supporting-rods rotatably and pivotally mounted on said pedestal, a rest or holder for the paper or the like slidable on said rods, and springs imparting tension to said rods whereby to create friction between the rods and the rest, as shown and described.

3. In a device of the character described, the combination with the pedestal; of a top plate pivoted about a vertical axis, and bearing a horizontal spindle, supporting-rods mounted on said horizontal spindle, and a holder or rest slidably fitted on said rods, and friction devices for holding it at various points thereon substantially as described.

4. In a device of the character described, the combination with a pedestal having a rotary top plate, of a horizontal spindle held to turn about its longitudinal axis on said top plate, supporting-rods secured at their lower ends to said spindle and provided with tension devices, and a holder or rest slidably fitted on said rods and held at various elevations on said rods, as set forth.

5. In a device of the character described, the combination with a pedestal, of supporting-rods mounted to swing in a vertical plane on said pedestal and also rotatable about said pedestal as a center, a rest or holder vertically slidable on said rods, and supporting-legs secured to said rest and provided with roller-feet arranged to move in the circumference of a circle of which the pedestal is a center, as set forth.

6. In a device of the character described, a pedestal provided with a rotary top plate, a horizontal spindle mounted to rotate about its longitudinal axis on said top plate and having a stop-lug, a slotted strap secured to said top plate and fitted around the lug on said spindle whereby to limit the movement of the latter, supporting-rods secured at their lower ends to said spindle, a rest or holder slidably mounted on said rods, bow-springs exerting tension between said rods whereby to create friction between the rods and rest, and a brake for locking said rest in adjusted position, as set forth.

7. In a device of the character described, supporting-rods, a rest or holder formed with apertures whereby it is slidably mounted on said rods, and a spring-brake secured to one of said rods and arranged to bind against the other rod, as set forth.

8. In a device of the character described, a rest or holder provided with cross-bars offset forwardly at their ends and fingers pivoted to the ends of said bars to swing in a plane parallel with that of the holder, and adapted to be turned over manuscript or the like on said holder, as set forth.

9. In a device of the character described, a rest or holder provided on its bottom with pivoted leaves or wings whose axis of motion is parallel to back of the rest and whose plane of adjustment is at right angles thereto and parallel to the bottom, forming widening extensions of the same substantially as described.

10. In a device of the character described, a rest or holder provided with a bottom rest or bar, and wings or leaves pivoted at one end to the face of said bottom bar, each wing being provided with a segmental slot and there being provided studs on the bar fitted in said slots, as set forth.

11. In a device of the character described, an auxiliary back or support constructed in hinged sections each of which is laterally extensible and provided with clips, as set forth.

12. The combination with a pedestal and parallel supporting-rods mounted thereon; of a book-holder and an adjustable bracket slidably mounted on said rods, and two book-spreaders one mounted on the lower portion of the holder and the other carried on the adjustable bracket and slidably mounted on the parallel supporting-rods of the book-holder in a position above the latter as described.

13. The combination with a pedestal and parallel supporting-rods mounted thereon; of a book-holder slidably mounted on said rods and two book-spreaders, one mounted on the book-holder and the other on the parallel supporting-rods above the book-holder said spreaders having an axial adjustment about an axis at right angles to the plane of the book-holder as described.

14. The combination with a pedestal and parallel supporting-rods mounted thereon; of a book-holder slidably mounted on said rods, and two book-spreaders one mounted on the book-holder and the other on the parallel supporting-rods above the book-holder, said spreaders having an axial supporting-rod arranged at right angles to the plane of the book-holder and being made adjustable in longitudinal direction and also adjustable about its axis as described.

15. In a device of the kind described the combination with the book-holder and its support; of a book-spreader comprising an axial rod arranged in bearings in a line substantially at right angles to the plane of the book-holder and having two bearing-arms offset to the same side of the axial center, said spreader being adjustable longitudinally as regards its axis, and in a circular path about its axis to remove the spreader from the edge of the book in turning the page substantially as described.

16. In a device of the kind described, the combination with the book-holder and its support; of a book-spreader comprising an axial rod arranged in a line substantially at right angles to the plane of the book-holder and having two bearing-arms offset to the same side of the axial center, a bearing for the axial rod and means for locking said axial rod and its arms substantially as described.

17. In a device of the kind described, the combination with the book-holder and its support; of a book-spreader comprising an axial rod arranged in a line substantially at right angles to the plane of the book-holder and having two bearing-arms offset to the same side of the axial center, a bearing for the said axial rod, and a friction device on said rod arranged to hold the bearing-arms down against the book substantially as described.

18. In a device of the kind described the combination with the book-holder and its two supporting-rods; of a cross-plate attached to said rods above the book-holder and having an arm attached thereto for supporting a lamp and friction-clamps 55 connecting said plate to the rods substantially as described.

In testimony whereof I have signed my name to this specification in the presence of two subscribing witnesses.

BURGESS T. MONTGOMERY.

Witnesses:
F. S. STITT,
SOLON C. KEMON.